(12) United States Patent
Dolan

(10) Patent No.: US 6,276,651 B1
(45) Date of Patent: Aug. 21, 2001

(54) MOUNTING DEVICE FOR FLAGPOLES

(76) Inventor: George D. Dolan, 58 Bendwood, Sugar Land, TX (US) 77478

( * ) Notice: Subject to any disclaimer, the term of this patent is extended or adjusted under 35 U.S.C. 154(b) by 0 days.

(21) Appl. No.: 09/483,161

(22) Filed: Jan. 14, 2000

(51) Int. Cl.$^7$ .................................................. A01K 97/10
(52) U.S. Cl. .............. 248/538; 248/229.12; 248/229.22; 411/408; 411/431
(58) Field of Search .................................. 248/538, 520, 248/534, 229.1, 229.15, 229.25, 229.22, 229.12, 230.3, 230.6, 231.41, 231.71; 135/16; 43/21.2; 411/429, 430, 431, 377, 408

(56) References Cited

U.S. PATENT DOCUMENTS

| | | |
|---|---|---|
| 1,015,717 | 1/1912 | Shimer . |
| 1,279,669 | 9/1918 | Deming . |
| 1,312,947 | 8/1919 | Billington . |
| 1,653,083 | 12/1927 | Blaw . |
| 2,686,029 | 8/1954 | Raymond . |
| 3,904,161 | 9/1975 | Scott . |
| 4,772,000 | * 9/1988 | Aubert ................................. 269/137 |
| 5,039,056 | 8/1991 | Paxton ................................. 248/539 |
| 5,131,780 | * 7/1992 | Love ..................................... 403/290 |
| 5,836,327 | 11/1998 | Davis .............................. 248/515 X |
| 5,857,658 | 1/1999 | Niemiec ............................... 248/534 |

* cited by examiner

Primary Examiner—Ramon O. Ramirez
(74) Attorney, Agent, or Firm—Browning Bushman

(57) ABSTRACT

A mounting device (14) for a flagpole (10) is mounted on a fixed horizontal support rail (16). Mounting device (14) has two generally identical parallel clamping plates (18, 20) each having a flagpole opening (28) for receiving the flagpole (10) and a stud opening (30) for receiving a threaded stud (46). Flagpole (10) is secured within aligned flagpole openings (28) of clamping plates (18, 20) and threaded stud (46) is secured within aligned stud openings (30). Stud (46) is secured at one end to clamping plate (18). A manual adjusting knob (56) threaded onto an extending end portion (54) of stud (46) is manually rotated for engaging clamping plate (20) to draw serrated teeth (26) on plates (18, 20) tightly against rail (16).

8 Claims, 3 Drawing Sheets

MOUNTING DEVICE FOR FLAGPOLES

FIELD OF THE INVENTION

This invention relates to a mounting device for flagpoles, and more particularly to such a mounting device particularly adapted for mounting on an elongate fixed support member such as a railing.

BACKGROUND OF THE INVENTION

In many apartment or condominiums, particularly high rise apartments or condominiums, it is desired to mount flags on outside railings, especially where restrictions do not permit the drilling of holes in masonry facades or walls for the installation of conventional mounting brackets for the flagpole. Railings for porches or patios may include an upper horizontal bar or rail and the flagpole mounting device of the present invention is particularly designed to be mounted onto such a horizontal bar or rail.

Heretofore, such as shown in U.S. Pat. No. 1,279,669 dated Sep. 24, 1918, flagpole mounting device have been provided which are effective for mounting a flagpole on a horizontal support member, such as a rod or post. The mounting device shown in the '669 patent loosely mounts the flagpole with a spring and does not permit mounting of the flagpole along various lengths of the flagpole. Also the firm securement of the mounting device to the horizontal support would be difficult as the mounting device is closely positioned adjacent opposed abutting surfaces.

SUMMARY OF THE INVENTION

The flagpole mounting device comprising the present invention includes a pair of generally identical clamping members or plates which may be mounted on opposed surfaces of a fixed horizontal support member, such as a rail pipe or bar. The clamping members have inner concave surfaces with serrated teeth to engage and grip the rail tightly upon installation of the mounting device. The clamping plates have axially aligned openings adjacent one end thereof to receive the flagpole and may be mounted on the horizontal support member at a predetermined angle for the display of flags at a desired angle. The ends are split at the openings to define a pair of gripping arms for each clamping plate. Each pair of gripping arms has aligned openings to receive a set screw for effecting a tight gripping engagement of the arms with the flagpole thereby to secure the flagpole to each of the clamping plates to provide a redundancy for a gripping of the flagpole. Thus, even though one pair of gripping arms is not tightly secured to the flagpole, the flagpole will remain in secured relation with the remaining pair of gripping arms.

The clamping plates also have opposed ends with axially aligned openings positioned outwardly of the horizontal support member to receive an externally threaded stud. The stud is secured within one opening and extends through the other opening with an end portion of the stud extending axially outwardly of the other opening. A manual adjusting knob has an integral internally threaded nut which may be threaded onto the extending end portion of the stud. The adjusting knob has a hard plastic body for receiving the threaded nut and an outer rubberlike cover extends over the plastic body for manual gripping. The plastic body is hollow to receive the nut and also provides space for the extending end portion of the stud. Manual gripping or rotation of the adjusting knob exerts a clamping force in a lever action against the clamping plates for tightly gripping of the rail by the clamping plates. The relatively large diameter of the adjusting knob over about two (2) inches permits the knob to exert a relatively high torque force from manual rotation of the knob. The mounting device may be easily mounted on metal or wooden railings of round, oval, rectangular, or irregular cross-sections. Set screw 44 furnished to lock in position permitting removal of knob to discourage theft.

An object of the invention is to provide a mounting device for a flagpole which may be easily mounted on a horizontal railing.

A further object of the invention is to provide such a mounting device in which a flagpole is first mounted on the mounting device and then the mounting device is easily mounted with the flagpole on a railing.

Another object of the invention is to provide such a flagpole mounting device which may be safely installed on an outside railing of a high rise condominium or apartment.

Other objects, features, and advantages of the invention will be apparent from the following specification and drawings.

DESCRIPTION OF THE INVENTION

Figure 1:
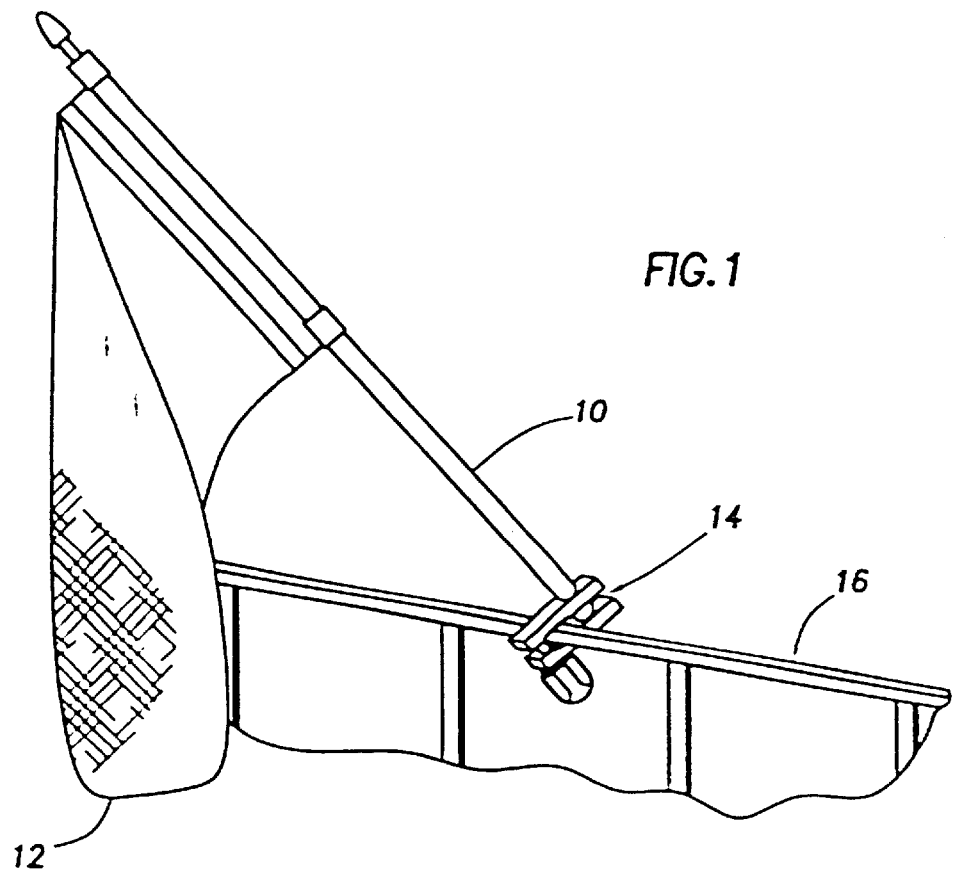
FIG. 1 is a perspective view of the mounting device of the present invention shown in an installed position on a fixed rail supporting a flagpole thereon having a flag at an outer end of the flagpole.
Figure 2:
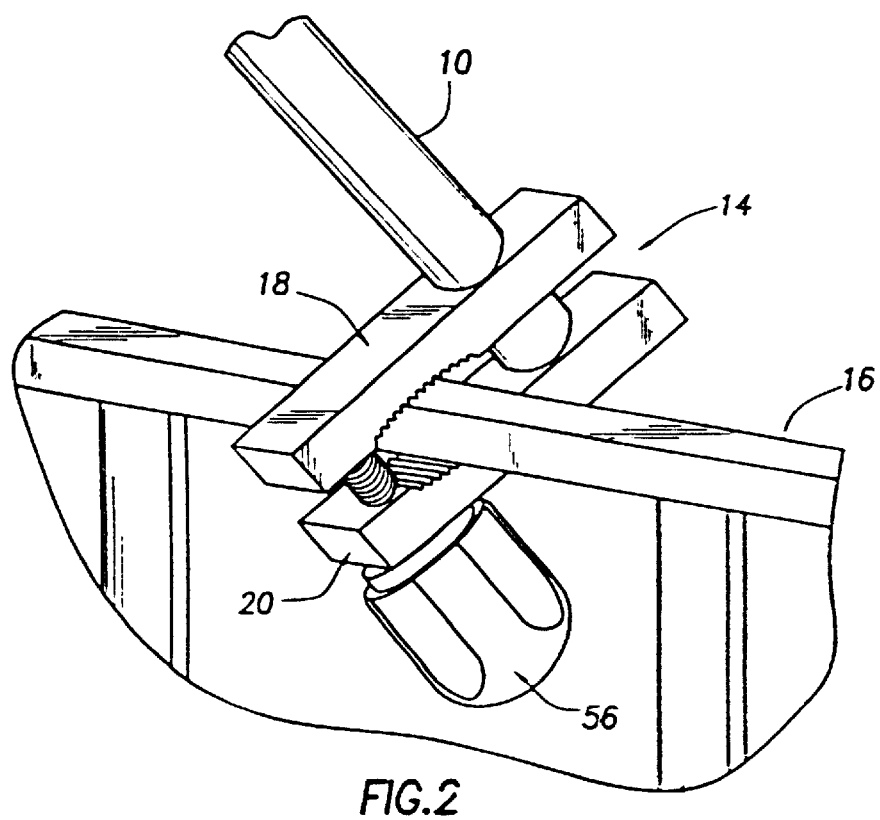
FIG. 2 is an enlarged perspective of the mounting device of FIG. 1 shown in an installed position on a rail.
Figure 3:
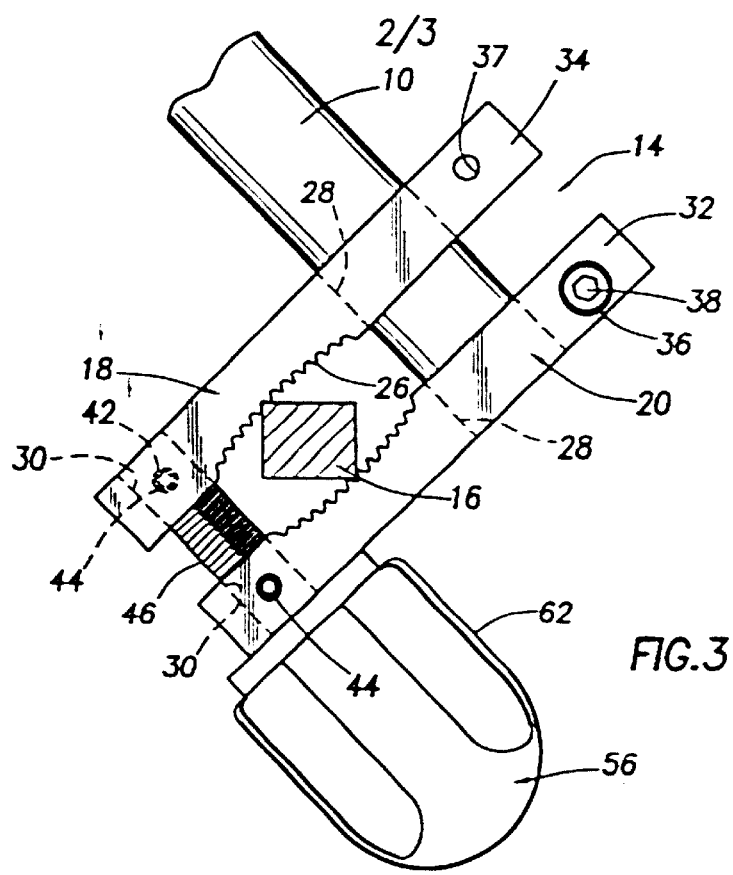
FIG. 3 is a plan view of the mounting device shown in an assembled position, about a rail.

Referring now to the drawings for a better understanding of this invention, and more particularly to FIGS. 1 and 2, a metal flagpole 10 of a circular cross-section is shown having a flag 12 mounted thereon. The flagpole mounting device of the present invention is shown generally indicated at 14 for mounting flagpole 10 and flag 12. Mounting device 14 is mounted on a fixed horizontal support member or rail 16 which may be the upper rail of a fixed railing structure secured between opposed walls of a building, such as an apartment or condominium, for example. Mounting device 14 is particularly adapted for mounting flagpole 10 on a fixed horizontal support member 16 where it is not feasible to utilize a conventional mounting bracket secured by nails or screws onto a planar mounting surface.

Figure 4:
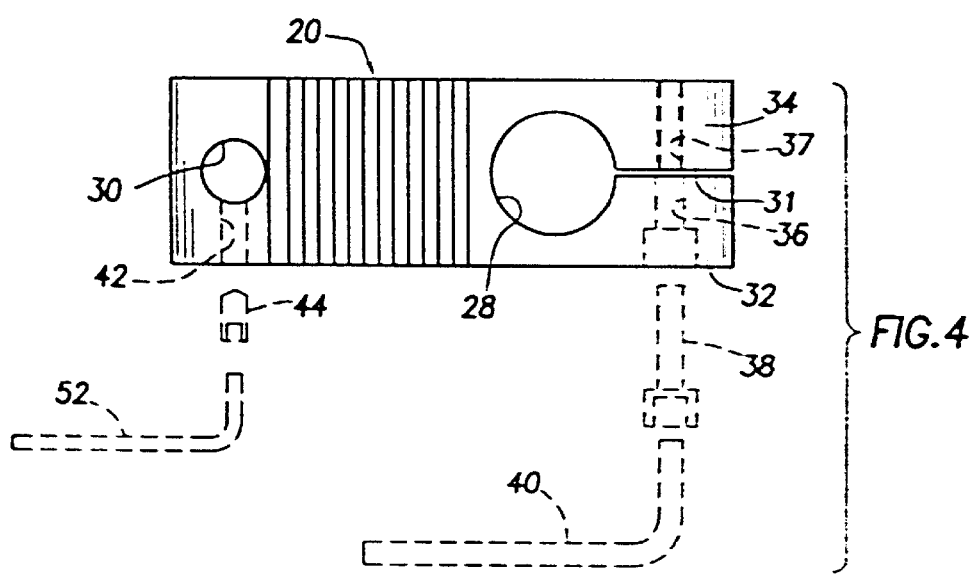
FIG. 4 is a plan view of a clamping plate.
Figure 5:
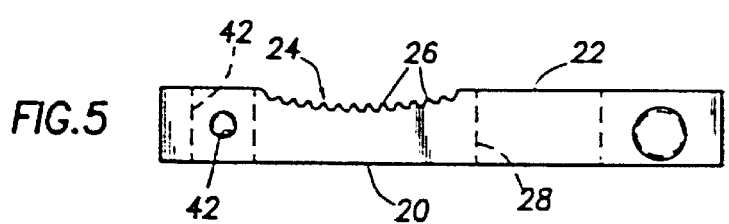
FIG. 5 is a side elevational view of the clamping plate shown in FIG. 4.
Figure 6:
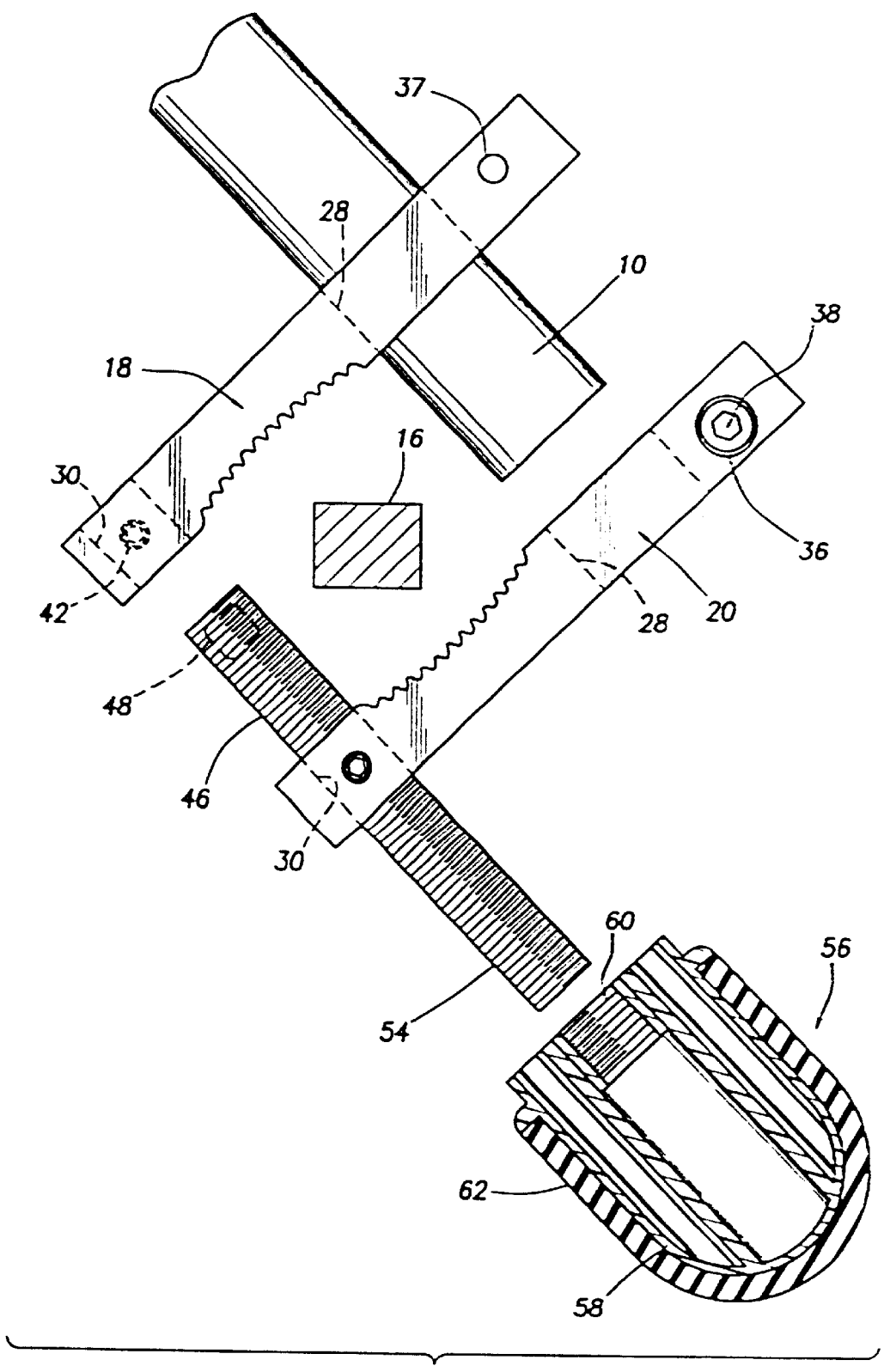
FIG. 6 is a perspective view showing elements of the clamping device disassembled.

Mounting device 14 has two generally identical spaced clamping plates or members 18 and 20 each having an inner surface 22 including a concave portion 24 having serrated teeth 26. The serrated teeth 26 on opposed clamping plates 18 and 20 tightly grip rail 16 when installed as will be explained further. Each clamping plate 18, 20 as shown in FIG. 4 for clamping plate 20 has a relatively large diameter circular opening 28 adjacent one side of serrated teeth 26 and a relatively small diameter opening 30 adjacent the other side of serrated teeth 26. The end portion of each clamping member 18, 20 adjacent opening 28 has a small slot or slit 31 to form opposed gripping arms 32 and 34. Arms 32, 34 have aligned openings 36 and 37 to receive set screw 38.

Opening 36 in arm 32 is unthreaded and opening 37 in arm 34 is internally threaded. Set screw 38 extends through opening 36 in arm 32 and is threaded within opening 37 of arm 34 for pulling arms 32, 34 toward each other in tight engagement with flagpole 10 when set screw 38 is tightened such as by an allen head wrench 40. Flagpole 10 may be inserted within axially aligned openings 28 with the end of flagpole flush with the outer surface of clamping plate 20. Set screw 38 is then inserted within aligned openings 36, 37 in arms 32, 34 of clamping member 20 and rotated for forcing arms 32, 34 of plate 20 into tight gripping relation with flagpole 10.

Opening 30 is unthreaded and a small diameter threaded bore 42 extends at right angles to opening 30 to receive a set screw 44 therein. An externally threaded stud 46 is received within aligned openings 30 of plates 18, 20 and has a small planar or flat area 48 thereon which is adjacent threaded bore 42 when the end of threaded stud 46 is flush with the outer surface of clamping plate 18. Threaded stud 46 is secured within opening 30 of clamping plate 18 by set screw 44 which is installed in contact with flat area 48 with an alien head wrench 52. When threaded stud 46 is secured to clamping member 18, an end portion 54 of stud 46 extends through opening 30 outwardly from the outer surface of clamping member 20. A manual gripping knob is shown generally at 56 and has a hollow, hard plastic body 58 with an open end and a threaded nut 60 mounted therein. Sufficient space is provided within knob 56 to receive extending end portion 54. An outer rubberlike covering 62 on knob 56 is adapted for manual gripping by an installer and knob 56 may be about two (2) inches in diameter to facilitate manual rotation. The threading of knob 56 onto the extending end portion 54 of threaded stud 46 after clamping plates 18, 20 receive rail 16 therebetween results in a tightening of mounting device 14 about rail 10 for mounting thereon.

Installation of Mounting Device

For mounting of flagpole 10 onto mounting device 14 and for installation of mounting device 14 onto rail 16, clamping plates 18 and 20 are positioned in opposed generally parallel relation to each other with openings 28 in axial alignment and openings 30 in axial alignment. Threaded stud 46 is then positioned within aligned openings 30 with the end of stud 46 flush with the outer surface of clamping plate 18 and flat area 48 adjacent bore 42. Next, set screw 44 is tightened by wrench 52 against flat area 48 of stud 46 to secure stud 48 to clamping plate 18. Flagpole 10 is then positioned within aligned openings 28 with the end of flagpole 10 flush with the outer surface of clamping plate 20. Then, with clamping plates 18 and 20 on opposed sides of rail 10, set screw 38 for clamping plate 20 is tightened by alien head wrench 40 to secure flagpole 10 to clamping plate 20. Next, clamping plate 18 is slipped along flagpole 10 until in contact with rail 16 and in generally parallel relation to clamping plate 20. Set screw 38 for clamping plate 18 is tightened to secure flagpole 10 to plate 18. Last, manual gripping knob 56 is threaded onto extending end portion 54 and manually tightened thereby to urge serrated teeth 26 on plates 18 and 20 into tight engagement with rail 16. If desired, a second set screw 44 adjacent knob 56 may be inserted within bore 42 of clamping plate 20 for engagement against threads on threaded stud 46. The second set screw 44 adjacent knob 56 when tightened against stud 46 releasably secures clamping members 18 and 20 about rail 16 even if knob 56 is removed or loosened. Thus, knob 56 may be removed to minimize theft or loss of mounting device 14 or knob 56. Clamping elements 18 and 20 are identical and are interchangeable. When installed, one of the clamping members is rotated 180 degrees relative to the other clamping member thereby to provide a mating pair of clamping members 18 and 20.

It is apparent that flagpole 10 and threaded stud 46 may be secured within aligned openings by other suitable means. Likewise, other elements for gripping the outer periphery of flagpole 10 within the aligned openings 28 could be utilized.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A device for mounting a flagpole on a fixed elongate support member comprising:

a pair of spaced generally parallel elongate clamping members having serrated teeth intermediate the ends of said clamping members to receive said elongate support member therebetween;

a pair of axially aligned flagpole openings adjacent one end of said clamping members on one side of said serrated teeth to receive said flagpole, said flagpole being secured within one of said flagpole openings;

a pair of axially aligned stud openings adjacent an opposed end of said clamping members on an opposed side of said serrated teeth;

an externally threaded stud received within said pair of aligned stud openings, said stud being secured within one of said stud openings and extending outwardly from the other aligned stud opening to form an extending end portion; and a manual gripping knob having an integral internally threaded adjusting nut threaded onto said extending end portion of said stud for tightly urging said opposed ends of said clamping members together against said elongate support member upon manual gripping and rotation of said knob.

2. The device as defined in claim 1 wherein:

said external stud has a substantially flat area adjacent said one of said stud openings receiving said stud; and a set screw engages said flat area for securement of said stud.

3. The device as defined in claim 1 wherein said manual gripping knob has a rigid body and a rubberlike cover on the body for manual gripping and rotation.

4. The device as defined in claim 3 wherein said rigid body has an open end and is hollow for receiving said adjusting nut and said stud.

5. A method for installing a flagpole mounting device on a fixed horizontal support rail, the mounting device having a pair of elongate clamping plates with each plate having a rail gripping portion and a flagpole opening adjacent one side of said gripping portion and a stud opening adjacent the opposite side of said gripping portion; said method comprising:

positioning the clamping plates on opposite sides of said rail in generally parallel relation to each other with the stud openings in said plates being in axial alignment and the flagpole openings in said plates being in axial alignment;

positioning an externally threaded stud in said pair of aligned stud openings with an end portion of said stud extending outwardly from one of said stud openings;

securing said stud within the other of said openings;

positioning said flagpole within said aligned pair of flagpole openings;

securing said flagpole within one of said flagpole openings;

providing a manual knob having an integral nut for threading onto said extending end portion of said stud upon; and engaging and exerting a tensile loading on said extending end portion of said stud upon rotation of said knob and threading of said nut onto said extending end portion to pull said clamping plates toward each other about said rail for tightly gripping said rail about said rail gripping portions.

6. The method as defined in claim 5 including providing a substantially flat area on said externally threaded stud; and said step of securing said stud includes applying a set screw against said substantially flat area.

7. The method as defined in claim 5, further comprising:

providing a set screw for engaging said stud after said stud is tensioned by said knob; and tightening said set screw against said stud after said stud is tensioned by said knob to permit removal of said knob.

8. A device for mounting a flagpole on a fixed elongate support member comprising:

a pair of spaced generally parallel elongate clamping members having serrated teeth intermediate the ends of said clamping members to receive said elongate support member therebetween;

a pair of axially aligned flagpole openings adjacent one end of said clamping members on one side of said serrated teeth to receive said flagpole, said flagpole being secured within one of said flagpole openings;

a pair of axially aligned stud openings adjacent an opposed end of said clamping members on an opposed side of said serrated teeth;

an externally threaded stud received within said pair of aligned stud openings, said stud being secured within one of said stud openings and extending outwardly from the other aligned stud opening to form an extending end portion;

an internally threaded adjusting nut threaded onto said extending end portion for tightly urging said opposed ends of said clamping members together against said elongate support member; and a set screw on one of said clamping members for securing said flagpole within one of said pair of aligned flagpole openings.

\* \* \* \* \*